United States Patent [19]
Ravani et al.

[11] Patent Number: 5,740,328
[45] Date of Patent: Apr. 14, 1998

[54] APPARATUS FOR ROBOTIC POSITIONAL REFERENCING AND CALIBRATION

[75] Inventors: Bahram Ravani, Davis; Walter W. Nederbragt, Petaluma, both of Calif.

[73] Assignee: The Regents of the University of California, Oakland, Calif.

[21] Appl. No.: 695,631

[22] Filed: Aug. 12, 1996

[51] Int. Cl.$^6$ .......................... G05B 19/00; G05B 19/42; G05B 19/10

[52] U.S. Cl. .......................... 395/93; 395/89; 395/99; 901/33; 901/46; 318/568.16; 318/569

[58] Field of Search .......................... 395/93, 99, 89; 901/33.46; 318/568.16, 569

[56] References Cited

U.S. PATENT DOCUMENTS

| | | | |
|---|---|---|---|
| 4,215,299 | 7/1980 | Edwin et al. | 318/574 |
| 4,362,977 | 12/1982 | Evans et al. | 318/568 |
| 4,561,776 | 12/1985 | Pryor | 356/72 |
| 4,575,802 | 3/1986 | Walsh et al. | 364/167 |
| 4,581,566 | 4/1986 | Ekstrom et al. | 318/568 |
| 4,642,781 | 2/1987 | Szonyi | 318/568 |
| 4,662,752 | 5/1987 | Tucker et al. | 901/47 |
| 4,815,006 | 3/1989 | Andersson et al. | 318/568 |
| 4,887,016 | 12/1989 | Malick | 318/568.13 |
| 4,961,267 | 10/1990 | Herzog | 33/503 |
| 4,967,370 | 10/1990 | Stern et al. | 901/46 |
| 4,970,401 | 11/1990 | Sadeh et al. | 250/560 |
| 5,334,918 | 8/1994 | McMurtry et al. | 318/568.16 |
| 5,390,128 | 2/1995 | Ryan et al. | 395/89 |

OTHER PUBLICATIONS

Bollinger et al., "A Sensor Based Technique for Automated Robot Programming," Journal of Manufacturing Systems, vol. 3, No. 6, pp. 13–26, 1984.

McCallion et al., "On Machine Perception of the Relative Position of Two Objects Using Bilateral Tactile Sensing Systems," Proceedings of the Institution of Mechanical Engineers, vol. 198B, No. 10, pp. 179–186, 1984.

Mooring et al., "Fundamentals of Manipulator Calibration," John Wiley & Sons, pp. 70–105, 1991.

Slocum, "Kinematic Couplings for Precision Manufacturing, Part 1: Formulation of Design Parameters," Precision Engineering, vol. 10, No. 2, pp. 85–91, 1988.

Slocum, "Kinematic Couplings for Precision Manufacturing, Part 2: Experimental Determination of Repeatability and Stiffness," Precision Engineering, vol. 10, No. 3, pp. 115–122, 1988.

Primary Examiner—George B. Davis
Attorney, Agent, or Firm—John P. O'Banion

[57] ABSTRACT

An apparatus for determining the relative position and pose of two objects. The apparatus includes a position sensing table and a tripod tactile sensing tool. The tactile sensing tool includes three digital indicator probes arranged in a tripod triangle. The position sensing table senses the position of each probe when in contact with the table. When all three probes are in contact with the table, the relative location of the table to the tool can be determined. The resulting information can be used for robotic part referencing and calibrations.

12 Claims, 5 Drawing Sheets

APPARATUS FOR ROBOTIC POSITIONAL REFERENCING AND CALIBRATION

BACKGROUND OF THE INVENTION

1. Field of the Invention

This invention pertains generally to part referencing systems, and more particularly to a single action tripod tactile sensing apparatus for determining the positional relationship between objects at various angles.

2. Description of the Background Art

Part referencing is the process of determining the relative location of a part with respect to a tool (such as a machine tool, a robot, or a material handling system) or with respect to a world coordinate system. Part location data is necessary for automated machine tool programming and part processing. In manufacturing, mechanical fixtures have been designed that would allow repeatable positioning of a pallet with respect to a machine tool at a predetermined location. In robot calibration, the position of the end-effector is usually measured at a set of pre-determined locations using some form of a sensing system. This data is then combined with joint encoder readings from the same set of locations to update the kinematic parameters of the robot in its programming system to improve its positioning accuracy.

Since both part referencing and calibration require measurement of relative locations between two objects, mechanical fixtures are usually used to simplify the sensing function and to improve repeatability. There are also approaches that have relied on directly measuring elements of feature surfaces of the parts eliminating the need for mechanical fixtures. These approaches have usually been based on the use of non-contact type sensing systems such as use of theodolites in robot calibration or laser interferometry.

More typically, however, mechanical fixtures are used in conjunction with touch or tactile sensing. Part referencing using tactile sensing involves bringing a sensing element and a surface of the part into contact with one another, activating the touch sensor, and measuring the location of the touch point in the sensor coordinate system. Several such tactile measurement systems for part referencing exist. For example, in a publication entitled "On Machine Perception of the Relative Position of Two Objects Using Bilateral Tactile Sensing Systems," published in the Proceedings of the Institution of Mechanical Engineers, Vol. 198B, No. 10, pp. 179–186, 1984, McCallion and Pham describe a method using a robot equipped with a touch sensing wand that touches a cube with touch sensitive surfaces. In addition, Duffie et al. describes a similar system except the cube is replaced with three spheres in their publication "A Sensor Based Technical for Automated Robot Programming," published in the Journal of Manufacturing Systems, Vol. 3, No. 6, pp. 13–26, 1984. A variation of the same system is also disclosed by Slocum, "Kinematic Couplings for Precision Manufacturing, Part 1: Formulation of Design Parameters," Precision Engineering, Vol. 10, No. 2, pp. 85–91, 1988. In addition to these two methods, there are numerous other methods that require placing an object held in the robot's gripper into a fixture that uniquely locates the robot.

A significant disadvantage of previously developed systems is that the robot must be placed in a certain configuration several times to get enough measurements necessary to determine the relative location. For example, the system described in Duffie et al. requires twelve measurements (four on each sphere) and the systems described by McCallion and Pham require between two and six measurements.

Therefore, there is a need for an apparatus that can obtain a complete location measurement in a single action without having to painfully place the robot in a certain configuration several times to get enough measurements necessary to determine the relative location or having tight positioning requirements for a single action operation. The present invention satisfies these two needs, as well as others, and overcomes deficiencies found in previously developed systems.

SUMMARY OF THE INVENTION

The present invention generally comprises a tactile sensing apparatus for determining the positional relationship between objects at any angle (within a range) with a single set of measurements, and can be used for both part referencing and calibration in robotics. The invention requires only a single positioning without any tight requirements for placement of the end effector at a pre-determined location. When a robot is being used for assembly or other tasks, the relative position between the parts and the robot may not be known. If the parts are fixed to a position sensing "table" such as the digitizer of the present invention, however, the location of the parts can be found relative to the robot. Additionally, the present invention can be used as a calibration tool by determining the current position of a robot manipulator so that all of the joint angles of the robot can be determined.

By way of example, and not of limitation, the invention incorporates a position sensing table and a tactile sensing tool. The sensing tool comprises three probes arranged in a triangular configuration. The probes generally comprise conventional digital indicators, or other distance measurement devices, as touch probes which provide a zero reading when fully extended and measure displacement when in contact with an object. The three digital indicators are positioned so that they are parallel and form a right triangle. Each digital indicator is equipped with a coil at its tip that is activated when the tip touches the position sensing table. The position sensing table, which comprises a conventional digitizing table or board, locates the position of each probe in relation to the reference coordinate system of the table when the probe tip is in contact with the table. Since the digital indicators allow movement of the tips of the probes, the tactile sensing tool can touch the surface oft he position sensing table at different inclinations and still get a complete reading. When each of the probe tips is in contact with the position sensing table, the relative location of the tactile sensing tool to the position sensing table can be determined using a conventional programmed control processor such as a personal computer.

Although digital indicators and a digitizer board are used in the present invention, devices with similar functions can be substituted. For example, the digital indicators can be replaced with linear variable differential transducers (LVDTs), and the digitizer board can be replaced with other position sensing pads or boards. Moreover, the digital indicators or similar devices do not need to be placed parallel to each other, although this configuration simplifies the design of the tactile sensing tool.

A typical sequence of steps for determining the relative positions of the tactile sensing tool and the position sensing table include the following:

(a) the robot attached to the tactile sensing tool would move over the position sensing table and proceed toward it.

(b) the first probe would make contact with the position sensing table and its digital indicator would move in.

(c) the second probe would make contact with the position sensing table and its digital indicator would move in.

(d) the third probe would make contact with the position sensing table and its digital indicator would move in.

(e) the robot would stop moving.

(g) the three coils at the tips of the digital indicators would be activated sequentially and the position sensing table would send the location of each touch reading the control processor.

(h) finally, the three digital indicators would send there readings to the control processor.

If all three probes contact the position sensing table at the same time, steps (b) through (d) occur simultaneously, in which case the robot stops and the measurement is made.

The control processor reads the location of the three touches from the position sensing table and the displacement of the three digital indicators. With this information, the control processor computes the location of the three touch points in the frame of the position sensing table and, since displacement of each digital indicator is known, also computes the location of the three touch points in the frame of the tactile sensing tool. Since the location of the three points is known in both frames, the control processor can compute the relative location of the tactile sensing tool to the position sensing table.

An object of the invention is to obtain multiple positional measurements in one contact.

Another object of the invention is to provide a single action device for complete position and pose measurements.

Another object of the invention is to provide for calibration and referencing in robotics and manufacturing.

Another object of the invention is to provide an apparatus having a position sensing table that can be made from a planar digitizing board.

Another object of the invention is to provide an apparatus having a tactile sensing tool that can contact a position sensing table over the entire area of the table and at different inclinations.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
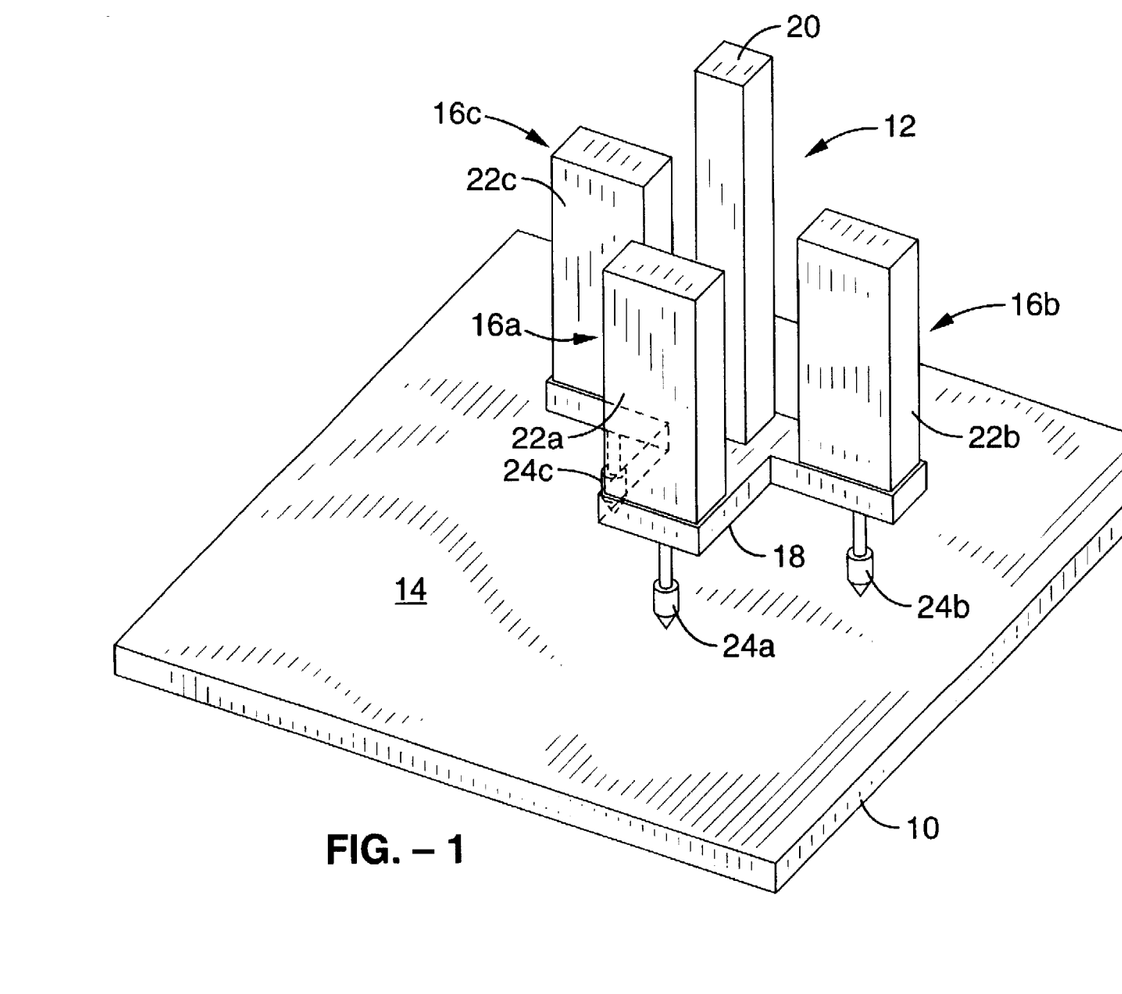
FIG. 1 is a perspective diagrammatic view of a tactile sensing tool and position sensing table in accordance with the present invention, with the tactile sensing tool shown in contact with the upper surface of the position sensing table.
Figure 3:
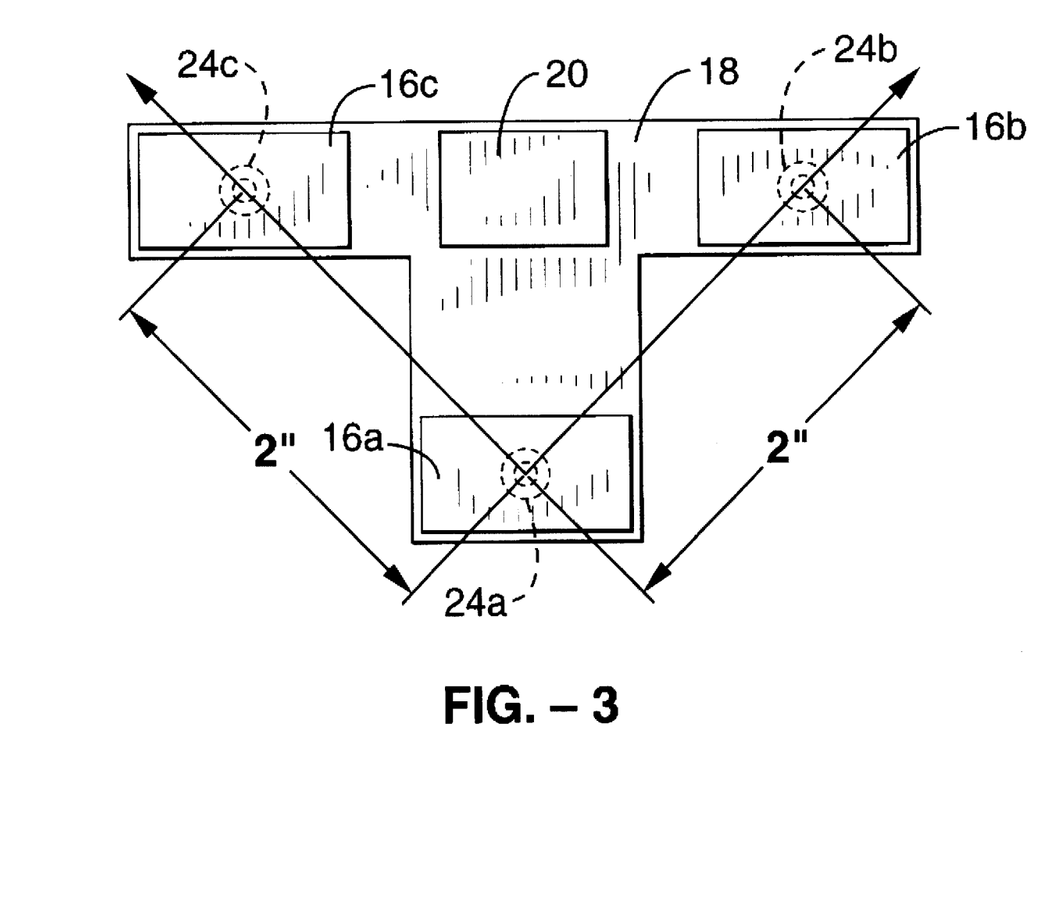
FIG. 3 is a plan view of the tactile sensing tool portion of the apparatus shown in FIG. 1, showing a typical triangular configuration of the probes.
Figure 4:
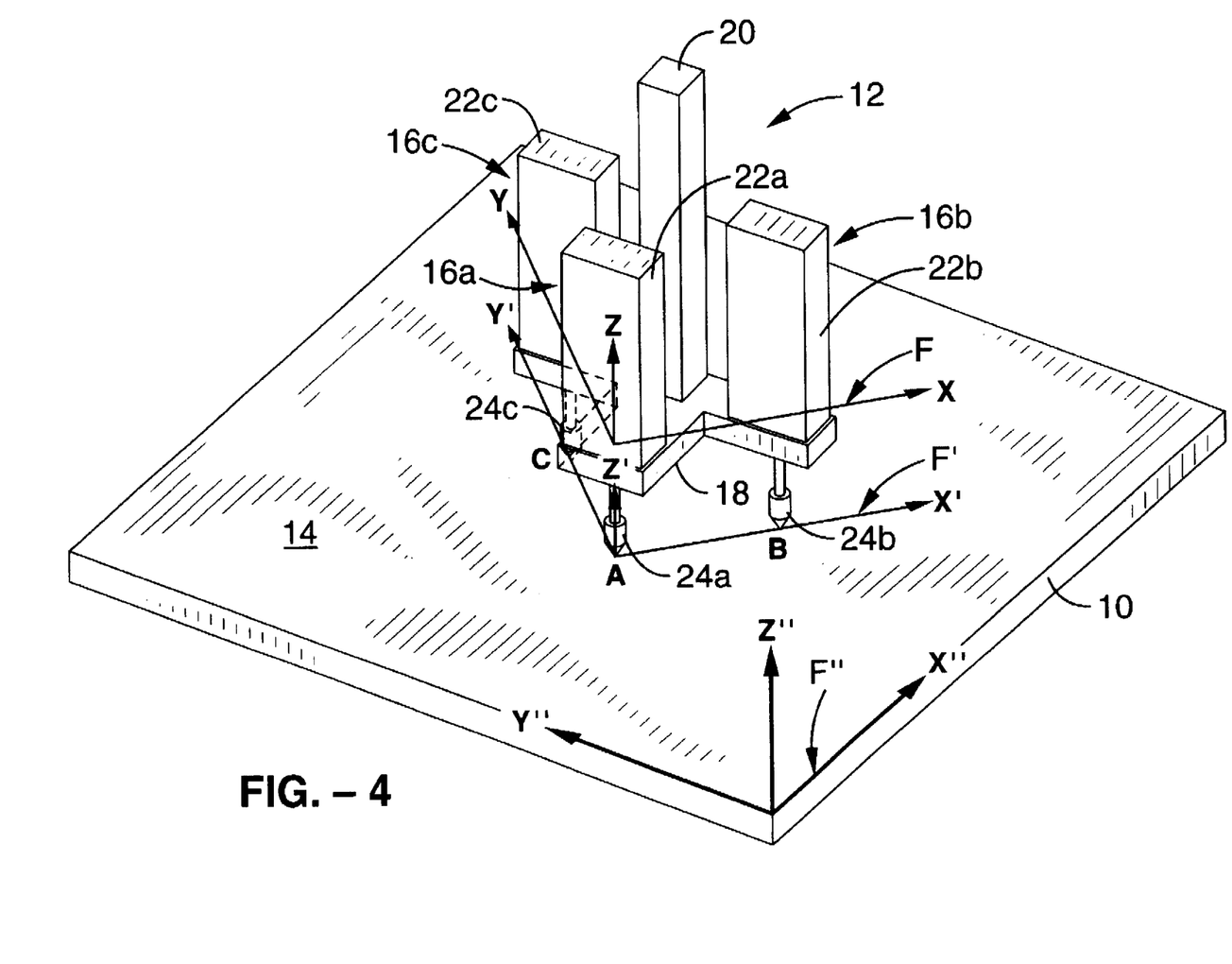
FIG. 4 shows the apparatus of FIG. 1 in relation to Cartesian coordinates defining the frames associated with the position sensing table and tactile sensing tool.
Figure 5:
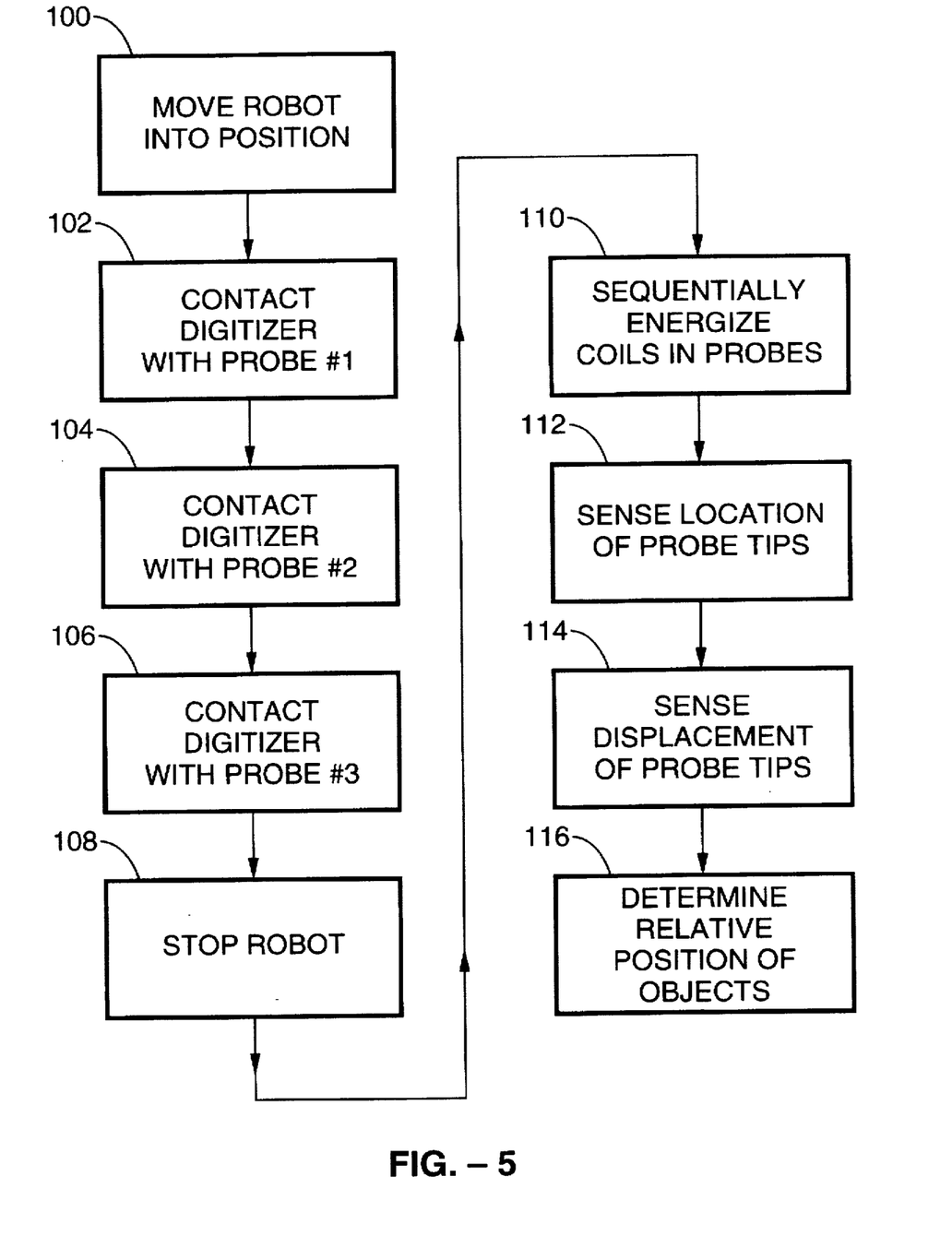
FIG. 5 is a flow chart showing a typical sequence of steps for determining the relative position of the tactile sensing tool and position sensing table in accordance with the present invention.

Referring more specifically to the drawings, for illustrative purposes the present invention is embodied in the apparatus generally shown in FIG. 1 though FIG. 4 and the method of use generally shown in FIG. 5. It will be appreciated that the apparatus may vary as to configuration and as to details of the parts and that the method of use may vary as to the specific steps and their sequence without departing from the basic concepts as disclosed herein.

Referring first to FIG. 1, a tactile sensing apparatus for determining the positional relationship between objects in accordance with the present invention includes a position sensing table 10 and a tactile sensing tool 12. The position sensing table 10 comprises a conventional digitizer board or the like, such as an AccuGrid-XNT model AX56H available from Numonics Corporation, that provides a serial output when a its upper surface 14 is contacted by a coil transducer. The tactile sensing tool 12 comprises three probes 16a, b, c carried by a support member 18 having a coupling link 20 configured for attachment to a robot end effector or the like (not shown). Each probe 16a, b, c comprises a conventional digital indicator 22a, b, c or the like, such as a Model #575-213 with a digital output cable #905338 available from Mitutoyo Corporation coupled to a coil holding tip 24a, b, c, respectively, containing a conventional coil used with a digitizer. It will be appreciated, however, that devices other than digital indicators could be employed provided that they can output a signal indicative of linear translation. For example, linear variable differential transducers (LVDTs) could be used, although they are more costly than digital indicators.

Figure 2:
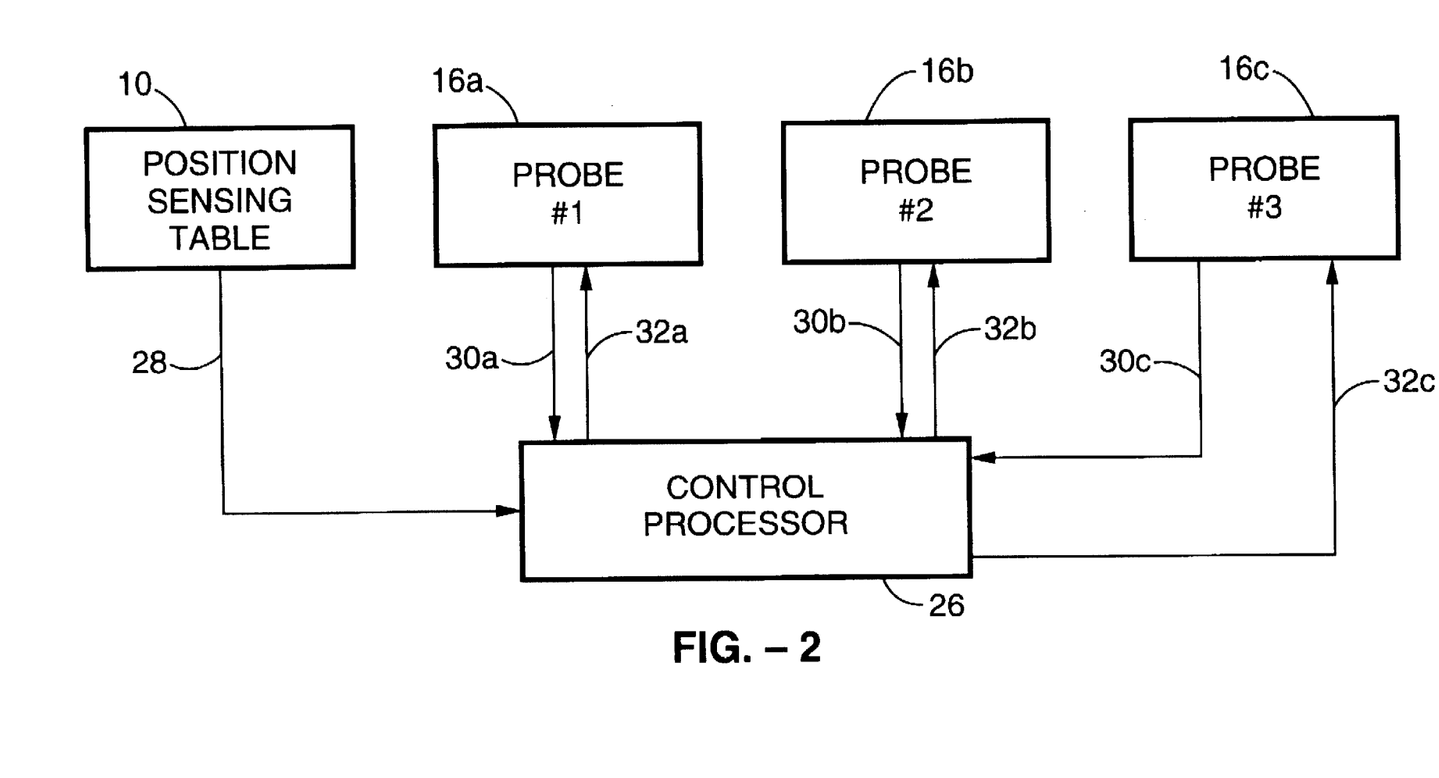
FIG. 2 is a functional block diagram of an apparatus in accordance with the present invention.

Referring also to FIG. 2, position sensing table 10 produces output signals indicative of the position of the coil holding tips 24a, b, c when those tips contact the upper surface 14 of position sensing table 10. Those signals provide a position measurement in relation to a fixed position (e.g., coordinate) on the position sensing table 10, such as the corner of the table. Additionally, digital indicators 22a, b, c produce output signals indicative of the amount of displacement of the coil holding tips 24a, b, c, respectively, in relation to a fixed position (e.g., coordinate) on the support member 18. For acquisition and processing of these signals, the position sensing table 10 is connected to a control processor 26, such as a conventional personal computer, or the like through a serial cable 28. Similarly, each of the digital indicators 22a, b, c in probes 16a, b, c would be connected to control processor 26 through digital cables 30a, b, c, respectively. Control processor 26 provides the function of energizing the coil holding tips 24a, b, c through power cables 32a, b, c, respectively, so that they can be sensed by the position sensing table 10, as well as the functions of acquiring signals from the position sensing table 10 and digital indicators 22a, b, c, and processing the acquired data to determine the relative position between the tactile sensing tool 12 and the position sensing table 10 as described below.

Referring to FIG. 1 and FIG. 3, probes 16a, b, c are preferably positioned so that their longitudinal axes are parallel. Additionally, probes 16a, b, c are positioned as a tripod in a triangular configuration as shown, preferably as a right triangle. The use of three probes in a triangular configuration is essential to the invention's ability to provide relative positional measurements with a single action; that is, without having to move the tactile sensing tool in and out for multiple sets of readings. This configuration, in addition to its simplicity, has the advantage of being able to measure the location of the object with one touching motion. Note, however, that the configuration does not have to be that of a right triangle, although use of a right triangle permits determination of relative position as described below which is computationally less complex than other triangular configurations. A right triangle is the preferred configuration because the reference frames are usually composed of vectors that are mutually perpendicular. Also, note that the spacing of the coil holding tips 24a, b, c is not critical, and that a two inch spacing is shown in connection with the example provided below. However, because there can be small errors in the measurements made, larger spacings will provide more accurate measurements because of a smaller percent error.

EXAMPLE 1

Referring now to FIG. 4, the relative location between a reference frame F (x, y, z) associated with support member 18 and a reference frame F" (x", y", z") attached to the corner of the position sensing table 10 is determined in the following manner. In FIG. 4 all three coil carrying tips 24a, b, c are shown as having contacted the upper surface 14 of the position sensing table 10 at points A, B and C, respectively. Digital indicator 222a gives a displacement reading of 0.500, digital indicator 22b gives a displacement reading of 0.700 and digital indicator 22c gives a displacement reading of 0.700. Additionally, coil carrying tips 24a, b, c are touching the digitizer surface at the following coordinates relative to x", y", z" which is the coordinate system for frame F":

Point A=(3,4,0)

Point B=(4.5, 2.662, 0)

Point C=(4.338, 5.5, 0)

In order to determine the relative positions of the frames, we need to find the transformation between frames F and F' (x', y', z') and the transformation between frames F' and F". To do so, we will first look at the coordinate transformation between frames F and F'.

Note that the distance between frames F and F' when the digital indicators are at rest is three inches along the z-axis for purposes of this example and, as shown in FIG. 3, the spacing between coil carrying tips 24a and 24c and between carrying tips 24a and 24c is two inches. Therefore, in frame F the three points of contact, A, B and C, between the tips of the digital indicators and the digitizer have the following values:

Point A=[0, 0, (−3+0.5)]=(0, 0, −2.5)

Point B=[2, 0, (−3+0.7)]=(2, 0, −2.3)

Point C=[0, 2, (−3+0.7)]=(0, 2, −2.3)

Now, looking at vectors AB, AC, and AB×AC in frame F, we have:

AB=(2, 0, −2.3)−(0, 0, −2.5)=<2, 0, 0.2>

AC=(0, 2, −2.3)−(0, 0, −2.5)=<0, 2, 0.2>

AB×AC=<2, 0, 0.2>×<0, 2, 0.2>=<−0.4, −0.4, 4>

Then, looking at the same points A, B and C in frame F', we have:

Point A=(0, 0, 0)

Point B=(2.010, 0, 0)

Point C=(0, 2.010, 0)

and $AB$=(2.010, 0, 0)−(0, 0, 0)=<2.010, 0, 0>

$AC$=(0, 2.010, 0)−(0, 0, 0)=<0, 2.010, 0>

$AB \times AC$=<2.010, 0, 0>×<0, 2.010, 0>=<0, 0, 4.040>

Now, using homogeneous coordinates, we can find a transformation matrix between frames F and F'. To do so, we take a vector <x, y, z> in frame F and find <x', y', z'> in frame F' according to:

$$\begin{bmatrix} x' \\ y' \\ z' \\ 0 \end{bmatrix} = \begin{bmatrix} a_{11} & a_{12} & a_{13} & \delta_1 \\ a_{21} & a_{22} & a_{23} & \delta_2 \\ a_{31} & a_{32} & a_{33} & \delta_3 \\ 0 & 0 & 0 & 1 \end{bmatrix} \begin{bmatrix} x \\ y \\ z \\ 0 \end{bmatrix}$$

and we take a point (x, y, z) in frame F and find its coordinates (x', y', z') in frame F' according to:

$$\begin{bmatrix} x' \\ y' \\ z' \\ 1 \end{bmatrix} = \begin{bmatrix} a_{11} & a_{12} & a_{13} & \delta_1 \\ a_{21} & a_{22} & a_{23} & \delta_2 \\ a_{31} & a_{32} & a_{33} & \delta_3 \\ 0 & 0 & 0 & 1 \end{bmatrix} \begin{bmatrix} x \\ y \\ z \\ 1 \end{bmatrix}$$

Since we have some known values for points and vectors in both frames, we can use these known quantities to find values for the homogeneous transformation matrix. Taking, for example point A, Point A in frame F=(0, 0, −2.5)

Point A in frame F'=(0,0,0)

as can be seen by $$\begin{bmatrix} 0 \\ 0 \\ 0 \\ 1 \end{bmatrix} = \begin{bmatrix} a_{11} & a_{12} & a_{13} & \delta_1 \\ a_{21} & a_{22} & a_{23} & \delta_2 \\ a_{31} & a_{32} & a_{33} & \delta_3 \\ 0 & 0 & 0 & 1 \end{bmatrix} \begin{bmatrix} 0 \\ 0 \\ -2.5 \\ 1 \end{bmatrix} \rightarrow \begin{matrix} -2.5a_{13} + \delta_1 = 0 \\ -2.5a_{23} + \delta_2 = 0 \\ -2.5a_{33} + \delta_3 = 0 \end{matrix}$$

For vector AB,

Vector AB in frame F=<2,0,0.2>

Vector AB in frame F'=<2.010, 0, 0> as can be seen by $$\begin{bmatrix} 2.010 \\ 0 \\ 0 \\ 0 \end{bmatrix} = \begin{bmatrix} a_{11} & a_{12} & a_{13} & \delta_1 \\ a_{21} & a_{22} & a_{23} & \delta_2 \\ a_{31} & a_{32} & a_{33} & \delta_3 \\ 0 & 0 & 0 & 1 \end{bmatrix} \begin{bmatrix} 2 \\ 0 \\ 0.2 \\ 0 \end{bmatrix} \rightarrow \begin{matrix} 2a_{11} + 0.2a_{13} = 2.010 \\ 2a_{21} + 0.2a_{23} = 0 \\ 2a_{31} + 0.2a_{31} = 0 \end{matrix}$$

For vector AC,

Vector AC in frame F=<0, 2, 0.2>

Vector AC in Frame F'=<2, 2.010, 0> as can be seen by $$\begin{bmatrix} 0 \\ 2.010 \\ 0 \\ 0 \end{bmatrix} = \begin{bmatrix} a_{11} & a_{12} & a_{13} & \delta_1 \\ a_{21} & a_{22} & a_{23} & \delta_2 \\ a_{31} & a_{32} & a_{33} & \delta_3 \\ 0 & 0 & 0 & 1 \end{bmatrix} \begin{bmatrix} 0 \\ 2 \\ 0.2 \\ 0 \end{bmatrix} \rightarrow \begin{array}{l} 2a_{12} + 0.2a_{13} = 0 \\ 2a_{22} + 0.2a_{23} = 2.010 \\ 2a_{32} + 0.2a_{33} = 0 \end{array}$$

Lastly, for vector AB×AC, $$\begin{bmatrix} 0 \\ 0 \\ 4.040 \\ 0 \end{bmatrix} =$$

$$\begin{bmatrix} a_{11} & a_{12} & a_{13} & \delta_1 \\ a_{21} & a_{22} & a_{23} & \delta_2 \\ a_{31} & a_{32} & a_{33} & \delta_3 \\ 0 & 0 & 0 & 1 \end{bmatrix} \begin{bmatrix} -0.4 \\ -0.4 \\ 4 \\ 0 \end{bmatrix} \rightarrow \begin{array}{l} -0.4a_{11} - 0.4a_{12} + 4a_{13} = 0 \\ -0.4a_{21} - 0.4a_{22} + 4a_{23} = 0 \\ -0.4a_{31} - 0.4a_{32} + 4a_{33} = 4.040 \end{array}$$

Using these twelve equations, the values for $\alpha_{11}$, $\alpha_{12}$, $\alpha_{13}$, $\alpha_{21}$, $\alpha_{22}$, $\alpha_{23}$, $\alpha_{31}$, $\alpha_{32}$, $\alpha_{33}$, $\delta_1$, $\delta_2$, $\delta_3$ are:

$\alpha_{11} = +0.99515$ $\alpha_{12} = -0.0099$ $\alpha_{13} = +0.0985$ $\alpha_{21} = -0.0099$ $\alpha_{22} = +0.99515$ $\alpha_{23} = +0.0985$ $\alpha_{31} = -0.09902$ $\alpha_{32} = -0.09902$ $\alpha_{33} = +0.9902$ $\delta_1 = +0.24625$ $\delta_2 = +0.24625$ $\delta_3 = +2.4755$ Using these values, the transformation matrix $T_1$ between F and F' becomes $$\begin{bmatrix} +0.99515 & -0.0099 & +0.0985 & +0.24625 \\ -0.0099 & +0.99515 & +0.0985 & +0.24625 \\ -0.09902 & -0.09902 & +0.9902 & +2.4755 \\ 0 & 0 & 0 & 1 \end{bmatrix}$$

Now that we have the transformation matrix between F and F', we need to find the transformation matrix between F' and F" as follows. For point A in both frames we have:

Point A in frame F'=(0, 0, 0)

Point A in frame F" =(3, 4, 0)

For vector AB in both frames we have:

Vector AB in frame F'=<2.010, 0, 0>

Vector AB in frame F"=<1.5, -1.338, 0>

Lastly, for vector A C in both frames we have:

Vector AC in frame F'=<0, 2.020, 0>

Vector AC in frame F"=<1.338, 1.5, 0>

Again, we want to find the transformation matrix for converting points and vectors from frame F' to frame F" and find values for $b_{11}$, $b_{12}$, etc. This can be accomplished using the following homogenous transformation matrix.

$$\begin{bmatrix} x" \\ y" \\ z" \\ 1 \end{bmatrix} = \begin{bmatrix} b_{11} & b_{12} & b_{13} & e_1 \\ b_{21} & b_{22} & b_{23} & e_2 \\ b_{31} & b_{32} & b_{33} & e_3 \\ 0 & 0 & 0 & 1 \end{bmatrix} \begin{bmatrix} x' \\ y' \\ z' \\ 1 \end{bmatrix}$$

Because Z' and Z" line up, we know that $b_{31}=b_{32}=b_{13}=b_{23}=0$ and $b_{33}=1$. We also know that $e_3=0$ because the origins for both frames have the same Z value of zero. Therefore, looking at vector AB we have:

$$\begin{bmatrix} 1.5 \\ -1.338 \\ 0 \\ 0 \end{bmatrix} = \begin{bmatrix} b_{11} & b_{12} & 0 & e_1 \\ b_{21} & b_{22} & 0 & e_2 \\ 0 & 0 & 1 & e_3 \\ 0 & 0 & 0 & 1 \end{bmatrix} \begin{bmatrix} 2.010 \\ 0 \\ 0 \\ 0 \end{bmatrix} \rightarrow \begin{array}{l} 2.010 b_{11} = +1.5 \\ 2.010 b_{21} = -1.338 \\ b_{11} = +0.7746 \\ b_{21} = -0.6657 \end{array}$$

Next, looking at vector AC we have:

$$\begin{bmatrix} 1.338 \\ 1.5 \\ 0 \\ 0 \end{bmatrix} = \begin{bmatrix} b_{11} & b_{12} & 0 & e_1 \\ b_{21} & b_{22} & 0 & e_2 \\ 0 & 0 & 1 & e_3 \\ 0 & 0 & 0 & 1 \end{bmatrix} \begin{bmatrix} 0 \\ 2.010 \\ 0 \\ 0 \end{bmatrix} \rightarrow \begin{array}{l} 2.010 b_{12} = +1.338 \\ 2.010 b_{22} = +1.5 \\ b_{11} = +0.6657 \\ b_{21} = -0.7463 \end{array}$$

Then, for point A, we have:

$$\begin{bmatrix} 3 \\ 4 \\ 0 \\ 1 \end{bmatrix} = \begin{bmatrix} b_{11} & b_{12} & 0 & e_1 \\ b_{21} & b_{22} & 0 & e_2 \\ 0 & 0 & 1 & e_3 \\ 0 & 0 & 0 & 1 \end{bmatrix} \begin{bmatrix} 0 \\ 0 \\ 0 \\ 1 \end{bmatrix} \rightarrow \begin{array}{l} e_1 = 3 \\ e_2 = 4 \end{array}$$

Using these values, the transformation matrix $T_2$ between F' and F" is:

$$\begin{bmatrix} +0.7463 & +0.6657 & 0 & 3 \\ -0.6657 & +0.7463 & 0 & 4 \\ 0 & 0 & 1 & 0 \\ 0 & 0 & 0 & 1 \end{bmatrix}$$

Therefore, if we have a point $P_1$ in frame F and we want to know its position relative to frame F", then $$P_1" = [T_2][T_1][P_1]$$

$$\text{where } [P_1] = \begin{bmatrix} P_{1x} \\ P_{1y} \\ P_{1z} \\ 1 \end{bmatrix} \text{ and } [P_1"] = \begin{bmatrix} P_{1x}" \\ P_{1y}" \\ P_{1z}" \\ 1 \end{bmatrix}$$

and if we have a vector $V_1$ in frame F and we want to know its position relative to frame F", then $$V_1" = [T_2][T_1][V_1]$$

where $[V_1] = \begin{bmatrix} V_{1x} \\ V_{1y} \\ V_{1z} \\ 1 \end{bmatrix}$ and $[V_1"] = \begin{bmatrix} V_{1x}" \\ V_{1y}" \\ V_{1z}" \\ 1 \end{bmatrix}$ So far, we have described a method that makes it possible to describe a point or vector in frame F" if it is given in frame F. In practicality, however, it may be desirable to take a point that is given in frame F" and describe it in frame F so that a robot can be moved directly to that point. This can be accomplished in the following manner. First, let $[T]=[T_2][T_1]$. Then, $[P_1"]=[T][P_1]$ and $[V_1"]=[T][V_1]$ If we take the inverse of [T], then $[P_1]=[T^1][P_1"]$ and $[V_1]=[T^1][V_1"]$ Now we can find points and vectors in frame F if they are given in frame F". Therefore, we can transfer information about points either way, F to F" or F" to F.

As can be seen, the present invention uses homogeneous coordinate transformations that are commonly used in robotics. The transformations are used to move points and vectors from one reference frame to another reference frame. In order to transfer a point, the transformation matrix is multiplied by a column vector [x,y,z,1] where (x,y,z) are the coordinates of that point. To transfer a vector to the other reference frame, the transformation matrix is multiplied by the column vector [x,y,z,0] where <x,y,z> are the components of the vector. Note the 1 and 0 at the end of the column vector make the calculations work for points and vectors. These values must be included when using this type of transformation.

Referring now to FIG. 5, a typical operational sequence for determining the relative positions of the tactile sensing tool and the position sensing table is shown. First, at step 100, the robot attached to the tactile sensing tool would move over the position sensing table and proceed toward it. At step 102, the first probe would make contact with the position sensing table and its digital indicator would move in. At step 104, the second probe would make contact with the position sensing table and its digital indicator would move in. At step 106, the third probe would make contact with the position sensing table and its digital indicator would move in. At step 108, the robot would stop moving. Next, at step 110, the three coils at the tips of the probes would be activated sequentially. At step 112, the position sensing table would send the location of each touch reading the control processor. At step 114, the three digital indicators would send there readings to the control processor. Note, however, if all three probes contact the position sensing table at the same time, steps 104 through 106 occur simultaneously, in which case the robot stops and the measurement is made.

At step 116, the control processor reads the location of the three touches from the position sensing table and the displacement of the three digital indicators. With this information, the control processor computes the location of the three touch points in the frame of the position sensing table and, since displacement of each digital indicator is known, also computes the location of the three touch points in the frame of the tactile sensing tool. Since the location of the three points is known in both frames, the control processor can compute the relative location of the tactile sensing tool to the position sensing table.

EXAMPLE 2

Since the invention will be used for calibration and referencing, it is important that the components used in the design are as accurate as possible. As will be appreciated, the accuracy of the apparatus is essentially limited by the accuracy of the digitizer and the digital indicators that are used. The digital indicators tested so far have a stoke of one inch (25.4 mm) with an accuracy of 0.001 inches (0.0254 mm) over that range. The digitizer used for the prototype fixture was relatively old and was found to be the limiting part for the accuracy of the prototype system developed.

Our test results show the system as having an accuracy of 0.030 inches (0.762 mm) over the 11.7 inch by 11.7 inch surface (300 mm×300 mm) of the digitizer used. It should be pointed out, however, that the accuracy of the system can be easily improved by using a more accurate digitizer. Digitizers are available with accuracy's of plus or minus 0.005 inches (0.127 mm) and sizes up to 44 inches by 60 inches (1100 mm×1500 mm).

Accordingly, it will be seen that this invention provides a single action system for complete position and pose measurements being made in one contact that can be used for calibration and referencing in robotics and manufacturing. In addition, the system can be used for updating tool coordinate systems as well as teaching Cartesian tool points and orientations in robot programming. Using the system at the end of a tool would allow measurement of a tool tip coordinate system with respect to the robot end coordinate system, thereby allowing for algorithms for automatic tool change in robotics and manufacturing applications. In robotic programming, the same system can also be used to teach location of various objects in the robot or the manufacturing tool environment in an automated fashion by placing the reference table at a specified location and placing the tripod sensing element on a pre-specified location on the digitizer table. This can simplify the task of Cartesian level robot programming.

Although the description above contains many specificities, these should not be construed as limiting the scope of the invention but as merely providing illustrations of some of the presently preferred embodiments of this invention. Thus the scope of this invention should be determined by the appended claims and their legal equivalents.

We claim:

1. An apparatus for measuring relative position between objects, comprising:
   (a) a position sensing table having a planar surface, said position sensing table including means for providing an output signal indicative of the position of a transducer contacting the surface of said position sensing table relative to a fixed position on said position sensing table;
   (b) a plurality of probes coupled to a support member in a triangular configuration, each probe having a displaceable tip, each said probe having means for providing an output signal indicative of the valve of displacement of said probe tip relative to a fixed position on said support member;
   (c) said probe tip having transducer means which uses said position sensing table for sensing when said probe tip contacts the surface of said position sensing table; and
   (d) processing means for determining the relative position of said support member and said position sensing table from position signals provided from said position sensing table and displacement signals provided from said probes.

2. An apparatus as recited in claim 1, further comprising means for sequentially sensing the position of said probe tips by said position sensing table.

3. An apparatus as recited in claim 1, further comprising means for sequentially sensing the displacement of said probe tips.

4. An apparatus as recited in claim 1, wherein said processing means comprises a programmed data processor.

5. A tripod tactile sensing system for robot calibration and referencing, comprising:

(a) a planar position sensing table, said position sensing table including means for providing an output signal indicative of the position of a transducer contacting said position sensing table relative to a fixed position on said position sensing table;

(b) a tripod tactile sensing tool, said sensing tool having a plurality of displaceable probe tips, said sensing tool having means for providing an output signal indicative of the value of displacement of each probe tip relative to a fixed position on said sensing tool;

(c) each said probe tip having transducer means which uses said position sensing table for sensing when said probe tip contacts said position sensing table; and (d) processing means for determining the relative position of said tactile sensing tool and said position sensing table from position signals provided from said position sensing table and displacement signals provided from said tactile sensing tool.

6. A tripod tactile sensing system as recited in claim 5, wherein said processing means includes means for sequentially sensing the position of said probe tips by said position sensing table.

7. A tripod tactile sensing system as recited in claim 5, wherein said processing means includes means for sequentially sensing the displacement of said probe tips.

8. A tripod tactile sensing system as recited in claim 5, wherein said processing means comprises a programmed data processor.

9. An apparatus for determining the relative position between moveable objects, comprising:

(a) a planar digitizing table, said digitizing table including means for providing an output signal indicative of the position of a transducer contacting said digitizing table relative to fixed coordinates on said position sensing table;

(b) a tactile sensing tool having three probes arranged in a triangular configuration, each probe having a displaceable tip, each said probe having means for providing an output signal indicative of the value of displacement of said probe tip relative to fixed coordinates on said sensing tool;

(c) each said probe tip having transducer means which uses said position sensing table for sensing when said probe tip contacts the surface of said digitizing table; and (d) processing means for determining the relative position of said tactile sensing tool and said digitizing table from position signals provided from said digitizing table and displacement signals provided from said tactile sensing tool.

10. An apparatus as recited in claim 9, wherein said processing means includes means for sequentially sensing the position of said probe tips by said position sensing table.

11. An apparatus as recited in claim 10, wherein said processing means includes means for sequentially sensing the displacement of said probe tips.

12. An apparatus as recited in claim 11, wherein said processing means comprises a programmed data processor.

* * * * *